(12) United States Patent
Straatveit et al.

(10) Patent No.: US 7,705,781 B2
(45) Date of Patent: Apr. 27, 2010

(54) HISTOGRAM FOR AMBIGUITY VISUALIZATION AND EVALUATION (HAVE)

(75) Inventors: Sverre Nils Straatveit, White Plains, MD (US); Peter William Schuck, Springfield, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 12/189,286

(22) Filed: Aug. 11, 2008

(65) Prior Publication Data
US 2010/0033378 A1    Feb. 11, 2010

(51) Int. Cl.
*G01S 5/02* (2006.01)

(52) U.S. Cl. .................. 342/424; 342/442; 342/445

(58) Field of Classification Search .............. 342/156, 342/424, 442, 445, 446
See application file for complete search history.

(56) References Cited

U.S. PATENT DOCUMENTS 5,574,468 A * 11/1996 Rose ..................... 342/442
7,330,840 B2    2/2008 Straatveit

OTHER PUBLICATIONS

Austeng, A. et al., "1D and 2D Algorithmically Optimized Sparse Arrays," 1997 IEEE Ultrasonics Symposium 1683 1686.

Hoctor, R.T. et al., "Array Redundancy for Active Line Arrays," IEEE Transactions on Image Processing, vol. 5, No. 7, pp. 1179-1183 (Jul. 1996).

Manikas, A. et al., "Manifold Studies of Nonlinear Antenna Array Geometries," IEEE Transactions on Signal Processing, vol. 49, No. 2, pp. 497-506 (Mar. 2001).

\* cited by examiner

*Primary Examiner*—Dao L Phan
(74) *Attorney, Agent, or Firm*—John J Karasek; Joslyn J Barritt (57) ABSTRACT

A method is provided for constructing a histogram to represent the root-mean-squared phase differences for a signal received at pairs of elements in an array. A pair-wise element phase difference ("PEP") between a signal received at an angle of arrival $\theta_1$ and a signal received at an angle of arrival $\theta_2$ are determined. The difference $\Delta\Psi$ between the differential phase measurements at $\theta_1$ and $\theta_2$ is computed. The process is repeated for all unique pairs of angles $(\theta_1, \theta_2)$ from 0 to 359 degrees and the results are summed over all PEPs to calculate the root mean squared phase difference $\sqrt{\langle \Delta\Psi^2(\theta_1,\theta_2)\rangle}$ between two different angles of arrival $\theta_1$ and $\theta_2$. A two-dimensional histogram is created by pairing the measurements $\sqrt{\langle \Delta\Psi^2 \rangle}$ and $\Delta\theta$, where $\Delta\theta=\theta_2-\theta_1$. The histogram can be used to determine whether a particular array is ambiguous to facilitate design of an array that can resolve and/or minimize ambiguities and so provide more accurate information regarding the source of a received signal.

5 Claims, 13 Drawing Sheets

2-Element Array

FIG. 3A

3-Element Right-Angle Array

HISTOGRAM FOR AMBIGUITY VISUALIZATION AND EVALUATION (HAVE)

TECHNICAL FIELD

The present invention relates to design of a precision radio-frequency emitter direction-finding interferometric array of antenna elements.

BACKGROUND

Radio-frequency transmissions received by an antenna array are increasingly important aspects of life in both the military and civilian worlds, and in many cases it can be crucial to determine the direction from which the transmissions originate. The military, particularly the Navy, needs cost-effective precision radio-frequency emitter direction-finding systems for applications including enhanced situational awareness, radar system cueing, and radar to electronic sensors tracking correlation. In the civilian realm, locating the direction from which received radio-frequency transmissions originate can aid in determining location information for cell phone calls to 911 emergency numbers, determining gunshot locations, or resolving ambiguities for commercial sonar arrays.

In general, direction-finding (DF) techniques can be classified as either amplitude comparison or phase comparison technologies. Amplitude comparison DF technologies are moderately priced, but provide only relatively low DF accuracy. Phase comparison technologies can provide better DF accuracy, but involve certain ambiguities that can make them prohibitively expensive.

For example, one phase comparison technique uses a linear interferometer comprising two or more antenna elements at a distance d apart. Using such an array to determine an angle of arrival (AoA) of a received radio-frequency wave involves measuring a difference, known as a pair-wise element phase difference (PEP) between a phase of the wave received at one element and a phase of the wave received at another element. However, such phase comparison techniques also involve ambiguities in determining a direction of an incoming signal because more than one incoming angle can often result in the same measured phase difference.

Interferometer DF accuracy is a function of aperture size, with a larger array providing better performance. A conventional high-performance linear interferometer array typically has four to six antenna channels and provides a field of view of greater than 90 degrees, and so in order to provide a full 360-degree field of view, four such arrays would be needed. However, as the array gets larger, additional phase ambiguities are introduced. In order to control the ambiguity, more antenna/receiver channels are typically added, but such additional channels can make the array too large, heavy, and costly to be a fully viable system, particularly for use on board a ship or in the growing unmanned aerial vehicle (UAV) field.

To address this problem, alternate interferometer designs are being sought. The history of antenna array geometry design has been formulated as an optimization problem, for example, a problem involving relatively prime integer optimization. Radio astronomers looking for an optimal design have used interferometry principles and have studied array redundancy. See e.g., "Hoctor, R. T. et al., "Array Redundancy for Active Line Arrays," IEEE Transactions on Image Processing, Vol. 5, No. 7, pp. 1179-1183 (July 1996). More recently, sensitivity analysis of the array manifold and its differential geometry have been explored for use as criteria for array geometry evaluation. See Manikas, A. et al., "Manifold Studies of Nonlinear Antenna Array Geometries," IEEE Transactions on Signal Processing, Vol. 49, No. 2, pp. 497-506 (March 2001). However, use of such differential geometry has limited application due to its difficult and purely mathematical nature.

Sparse linear interferometers comprise one alternative interferometer design. Sparse linear interferometers are based on non-periodic antenna element placement and are set to provide maximum phase ambiguity resolution with a minimum number of channels. Due to the nature of the design of a sparse interferometer, although doubling the DF accuracy requires a doubling of the length of the array, it does not require a doubling of the number of channels, and therefore sparse linear interferometers scale very efficiently. See, e.g., Austeng, A. et al., "1D and 2D Algorithmically Optimized Sparse Arrays," 1997 IEEE Ultrasonics Symposium 1683-1686.

These and other efforts at antenna array design are described in U.S. Pat. No. 7,330,840, "Method and Apparatus for Genetic Fuzzy Design," issued to Sverre Nils Straatveit, one of the inventors of the present invention, the entire disclosure of which is hereby incorporated by reference herein. Other antenna array design considerations are described in the United States patent application entitled "Sparse Interferometric Array for Radio Frequency Azimuth Direction Finding," Navy Case No. 98332-US1, by Sverre Nils Straatveit which was filed concurrently with the present application and the entire disclosure of which is incorporated herein by reference.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter.

The present invention provides a method for visualizing and evaluating an array's ability to resolve ambiguities in emitter direction and to produce an unambiguous angle of arrival (AoA) measurement. Such a method can be used as part of an array design process, such as a process using a Genetic Fuzzy array design algorithm.

In the method according to the present invention, a histogram is constructed to represent the root-mean-squared phase differences between all the PEPs at two different angles of arrival $\theta_1$ and $\theta_2$. A phase difference $\Delta\Phi_{m,n}(\theta_1)$ between a signal received by two elements m and n in an array at an angle of arrival $\theta_1$ and a phase difference $\Delta\Phi_{m,n}(\theta_2)$ between elements m and n at an angle of arrival $\theta_2$ are determined. The difference $\Delta\Psi$ between the differential phase measurements at $\theta_1$ and $\theta_2$ is computed.

This process is repeated for each PEP in the array for all unique pairs of angles ($\theta_1$, $\theta_2$) from 0 to 359 degrees and the results are summed over all PEPs to calculate the root mean squared phase difference $\sqrt{\langle\Delta\Psi^2(\theta_1,\theta_2)\rangle}$ between two different angles of arrival $\theta_1$ and $\theta_2$. A two-dimensional histogram for ambiguity visualization and evaluation (HAVE) is created by pairing the measurements $\sqrt{\langle\Delta\Psi^2\rangle}$ and $\Delta\theta$, where $\Delta\theta=\theta_2-\theta_1$. The HAVE can be used to determine whether a particular array is ambiguous to facilitate design of an array that can resolve and/or minimize ambiguities and so provide more accurate information regarding the source of a received signal.

BRIEF DESCRIPTION OF THE DRAWINGS

FIGS. 3A-3C depict exemplary arrays used in the description of histograms for array visualization and evaluation (HAVEs) in accordance with the present invention.

DETAILED DESCRIPTION

The aspects summarized above can be embodied in various forms. The following description shows, by way of illustration, combinations and configurations in which the aspects can be practiced. It is understood that the described aspects and/or embodiments are merely exemplary, and that one skilled in the art may utilize other aspects and/or embodiments or may make structural and functional modifications without departing from the scope of the present disclosure.

For example, although aspects and features of a histogram for ambiguity visualization and evaluation and methods of deriving thereof may be described herein in the context of an array of antenna elements receiving a radiofrequency signal, it would be apparent to one of ordinary skill in the art that the histogram for ambiguity visualization and evaluation and methods of deriving the same can be used in algorithms to evaluate performance of an antenna array in determining an angle of arrival of a signal. In addition, aspects and features are described herein in the context of a one-dimensional array comprising two elements or a triangular array comprising three elements, it would be apparent to one of ordinary skill in the art that the histogram and methods of deriving the same can be used with other array configurations as well, such as an array having a larger number of elements, an array having larger dimensionality, or an array having different geometries than the arrays described herein. Moreover, although the histogram and methods for deriving thereof are described in the context of their use in a Genetic Fuzzy algorithm such as that described in U.S. Pat. No. 7,330,840, it would be apparent to one of ordinary skill in the art that the histogram would be useful in other antenna design methodologies and would not be limited to any particular application or design method.

As noted above, there is a desire to design antenna arrays for reception of radiofrequency emissions and to design the arrays such that a direction of the emission and thus its source can be determined. The design of such an array must balance considerations of size, weight, and physical element placement constraints against considerations of resolution and accuracy.

These competing considerations can be particularly important in the growing field of unmanned aerial vehicle (UAV) applications. An array for use in a UAV application ideally would provide 360-degree coverage with high direction-finding resolution (e.g., approaching tenths of a degree) while being small and light enough to fit on a UAV, all at a low cost. However, low cost implies few elements, while high resolution requires a wider array and perhaps more elements. In addition, the need to avoid mutual coupling of the elements in the array may require that the elements be spaced farther apart, which introduces ambiguities in the detected direction of the signal. Thus there is a need for a method and system for designing an antenna array that can resolve the detected direction and produce an unambiguous angle of arrival (AoA) measurement.

One method that has been developed to address these competing concerns is the use of the Genetic Fuzzy array design algorithm described in U.S. Pat. No. 7,330,840, "Method and Apparatus for Genetic Fuzzy Design," described above. The present invention provides an input that can be used as a criterion in evaluating an antenna design in the Genetic Fuzzy algorithm of the '840 patent.

Figure 1:
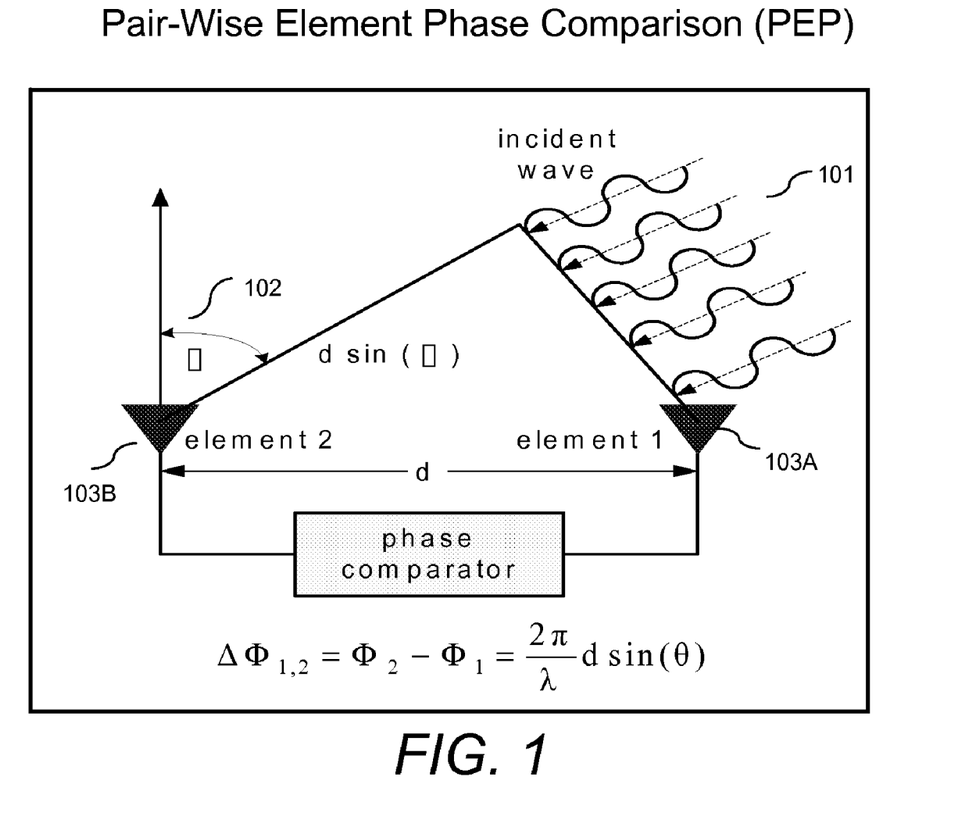
FIG. 1 is a schematic showing a pair-wise element phase difference (PEP) between two elements 1 and 2 in an array.

As noted above, one commonly used direction-finding (DF) technology involves phase comparison between elements in a linear interferometer comprising two or more antenna elements. FIG. 1 depicts an exemplary linear interferometer showing element 1 (103A) and element 2 (103B) placed at a distance d apart. In conventional interferometer design, element 1 and element 2 are placed less than or equal to one-half wavelength apart, i.e., $$d \leq \frac{\lambda}{2}.$$

In many cases, it would be more advantageous to place the elements farther apart to reduce mutual coupling and shadowing, avoid physical interference of broadband elements, and improve resolution. As shown in FIG. 1, an incoming waveform, for example, an incoming radiofrequency signal, is received by a pair of elements 1 and 2 in the array. The incoming signal 101 is received by the pair of elements at a single angle of arrival θ 103 and by each element at a particular phase Φ of the incident wave. The pair-wise element phase difference $\Delta\Phi_{1,2}$ in the signal phase received by element 1 and element 2, referred to herein as a "PEP," is given by the equation:

$$\Delta\Phi_{1,2} = \Phi_2 - \Phi_1 = \frac{2\pi}{\lambda} d\sin(\theta)$$

where $\Phi_1$ and $\Phi_2$ are the phases in radians of the received RF signal at elements 1 and 2, respectively, and d is the distance between them.

Figure 2A:
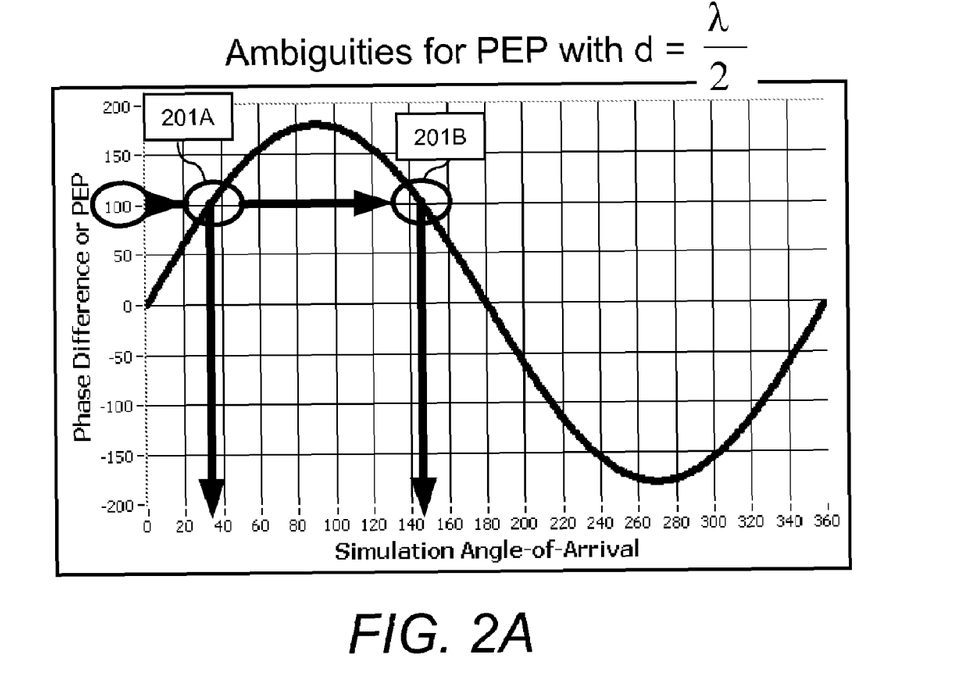
FIGS. 2A and 2B are plots showing the existence of ambiguities in calculated angle of arrival θ for a single PEP at a distance one-half and one wavelength apart, respectively.
Figure 2B:
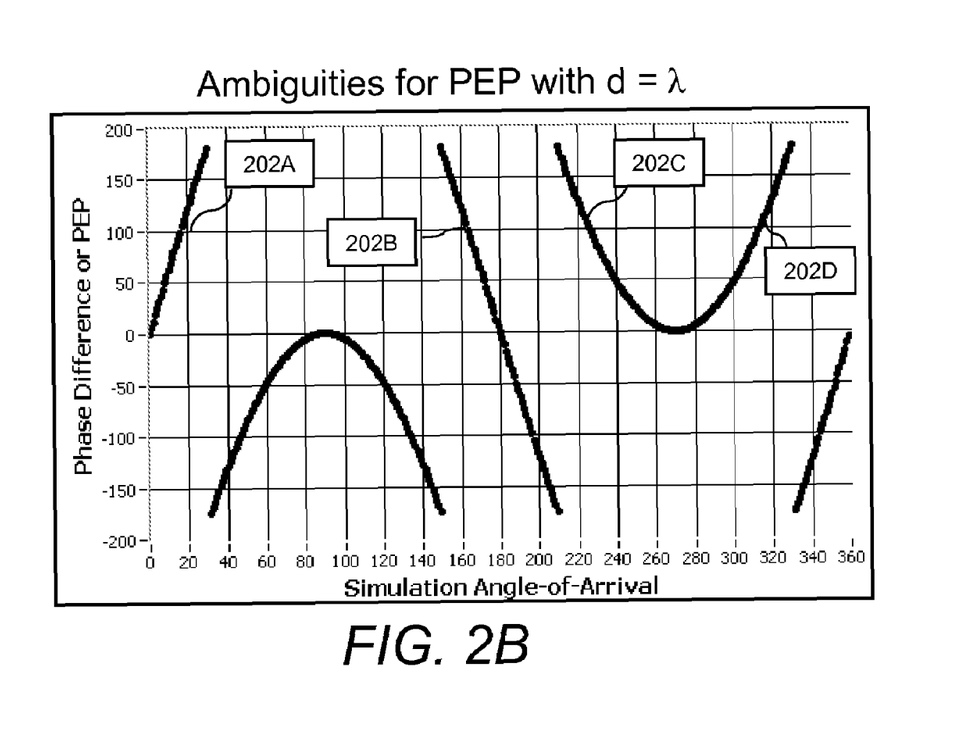

As shown in FIGS. 2A and 2B, the AoA estimated by a single PEP for any one pair of elements 1 and 2 is ambiguous. In other words, there are at least two different angles θ that can produce the same phase difference $\Delta\Phi_{1,2}$. Thus, as shown in FIG. 2A, for two elements placed one-half wavelength apart $$\left(d = \frac{\lambda}{2}\right),$$

there is one "mirror reflection" ambiguity for each phase difference ΔΦ. For example, at ΔΦ=100 degrees, the angle of arrival θ can equal either 34 degrees (201A) or 146 degrees (201B); the PEP cannot distinguish between those two values. This ambiguity, which can be referred to as a "mirror" ambiguity, can be fairly easily resolved because only two possible angles need to be examined. As seen in FIG. 2A, the array is ambiguous over an entire 180-degree range. In addition, the number of ambiguities increases as the distance between elements increases. Thus, as shown in FIG. 2B, for a PEP comprising two elements one wavelength apart, i.e., d=λ, the number of possible angles of approach increases to four, so that at ΔΦ=100, the AoA θ can equal any one of 16 (202A), 164 (202B), 227 (202C), or 314 (202D) without the PEP being able to distinguish among them. Although a small ambiguity, for example, less than 5 degrees, in the angle of arrival may be acceptable, an ambiguity of 16 versus 224 degrees—almost opposite directions—is very likely not to be acceptable because of the great difference in arrival directions. Thus, design of an interferometer array must reconcile the desire for increased array size to improve accuracy with the need for resolution of the resulting ambiguities and more precise determination of the angle of arrival.

As noted above, one effort to reconcile these competing considerations in array design is described in U.S. Pat. No. 7,330,840, "Method and Apparatus for Genetic Fuzzy Design," issued to Sverre Nils Straatveit, one of the inventors of the present invention. The '840 patent describes a Genetic Fuzzy algorithm which uses a genetic algorithm to optimize conflicting design criteria and uses fuzzy logic to compare disparate criteria. The Genetic Fuzzy algorithm will produce a number of potentially suitable array designs. These array designs must be evaluated to find those that best provide precise, unambiguous information on the angle of arrival of an incoming RF signal.

The present invention provides a methodology for evaluating the often high-dimensional array manifold space for ambiguities by a transformation to a two-dimensional representation that can be easily analyzed both mathematically and visually to determine whether a potential array design can unambiguously determine an angle of arrival and thus determine the direction of the source of an incoming signal.

As described above, an array of antenna elements comprises a number of pairs of elements, each pair having a pair-wise phase difference $\Delta\Phi_{m,n}$, referred to herein as a "PEP." An array having $N_E$ elements can thus be combined into an array of $N_{PEP}$ PEPs where $$N_{PEP} = \frac{N_E(N_E - 1)}{2}$$

In the method according to the present invention, a histogram is constructed to represent the "distance" between $N_{PEP}$ PEPs in the array at a first angle of arrival $\theta_1$ and a second angle of arrival $\theta_2$. A phase difference $\Delta\Phi_{m,n}(\theta_1)$ between two elements m and n at an angle of arrival $\theta_1$ and a phase difference $\Delta\Phi_{m,n}(\theta_2)$ between elements m and n at an angle of arrival $\theta_2$ are determined. In addition, for each pair of arrival angles $\theta_1$ and $\theta_2$, a difference $\Delta\theta_{1,2}$ is determined, where $\Delta\theta_{1,2}=\theta_2-\theta_1$.

In accordance with the present invention, a two-dimensional histogram for ambiguity visualization and evaluation (HAVE) can be constructed as follows. The difference $\Delta\Psi_{m,n}$ between the $\Delta\Phi_{m,n}$ values for $\theta_1$ and $\theta_2$ is computed for a $PEP_{m,n}$ at all unique combinations of arrival angles $\theta_1$ and $\theta_2$ from 0 to 359 degrees:

$$\Delta\Psi_{m,n}(\theta_1,\theta_2)=\Delta\Phi_{m,n}(\theta_2)-\Delta\Phi_{m,n}(\theta_1).$$

This process is repeated for each PEP in the array. The $\Delta\Psi_{m,n}(\theta_1, \theta_2)$ results are squared and then summed over all $N_{PEP}$ PEPs in the array to calculate the root mean squared phase difference $\sqrt{\langle\Delta\Psi^2(\theta_1,\theta_2)\rangle}$, or "distance," between the phase difference at two different angles of arrival $\theta_1$ and $\theta_2$ for the entire array:

$$\sqrt{\langle\Delta\Psi^2(\theta_1, \theta_2)\rangle} \equiv \frac{\sqrt{2}}{\sqrt{N_E(N_E-1)}} \sqrt{\sum_{n=1,m=n+1}^{N_E} \Delta\Psi_{n,m}^2(\theta_1,\theta_2)}.$$

The HAVE in accordance with the present invention can be created by pairing the measurements $\sqrt{\langle\Delta\Psi^2(\theta_1,\theta_2)\rangle}$ and $\Delta\theta_{1,2}$ and binning. The HAVE can be used to determine whether a particular array is ambiguous and can thus facilitate design of an array that can resolve and/or minimize ambiguities and provide more accurate information regarding the source of a received signal.

For example, if $\sqrt{\langle\Delta\Psi^2(\theta_1,\theta_2)\rangle}$ is large, i.e., the root mean square phase difference between two different angles of arrival $\theta_1$ and $\theta_2$ over the entire array is large, then the two different angles of arrival $\theta_1$ and $\theta_2$ can be easily distinguished even if the difference in angle of arrival $\Delta\theta_{1,2}$ is small.

If $\sqrt{\langle\Delta\Psi^2(\theta_1,\theta_2)\rangle}$ is small and $\Delta\theta_{1,2}$ is small, the array has some ambiguity, but the ambiguity is not serious because the error in the estimated the angle of arrival is small.

If $\sqrt{\langle\Delta\Psi^2(\theta_1,\theta_2)\rangle}=0$ and $\Delta\theta_{1,2}=0$, there is no ambiguity, since $\theta_2=\theta_1$ and all PEPs are measuring the same angle. On the other hand, if $\sqrt{\langle\Delta\Psi^2(\theta_1,\theta_2)\rangle}=0$ and $\Delta\theta_{1,2}\neq 0$, there is an ambiguity in the array because each PEP measures the same phase at both an angle of arrival $\theta_1$ and a different angle of arrival $\theta_2$. However, even if $\sqrt{\langle\Delta\Psi^2(\theta_1,\theta_2)\rangle}=0$ for some $\Delta\theta$ this does not mean that $\Delta\Phi_{n,m}(\theta_1)$ for one pair of elements (n, m) equals $\Delta\Phi_{n',m'}(\theta_1)$ for another pair of elements (n', m').

In addition, even if one PEP in the array is ambiguous for a particular angle of arrival, there may be another PEP in the array that is not, and thus the ambiguity may be resolved over the entire array, and would be indicated by a non-zero "distance" measurement $\sqrt{\langle\Delta\Psi^2(\theta_1,\theta_2)\rangle}\neq 0$. However, if $\sqrt{\langle\Delta\Psi^2(\theta_1,\theta_2)\rangle}\neq 0$ the array can be effectively ambiguous if $\sqrt{\langle\Delta\Psi^2(\theta_1,\theta_2)\rangle}$ is small and $\Delta\theta$ is large. In addition, ambiguities and near ambiguities can be introduced by noise in the array. All of these ambiguities should be resolved in order for the array to provide a precise, accurate estimate of the angle of arrival of an incoming signal.

The histograms created using the method of the present invention and their implications in array design will now be described in the context of the following exemplary arrays. In the figures discussed in the following description, the "abscissa" axis represents values of $\Delta\theta$ from 0 to 359, while the "ordinate" represents values of $\sqrt{\langle\Delta\Psi^2(\theta_1,\theta_2)\rangle}$ for the array.

Figure 3A:
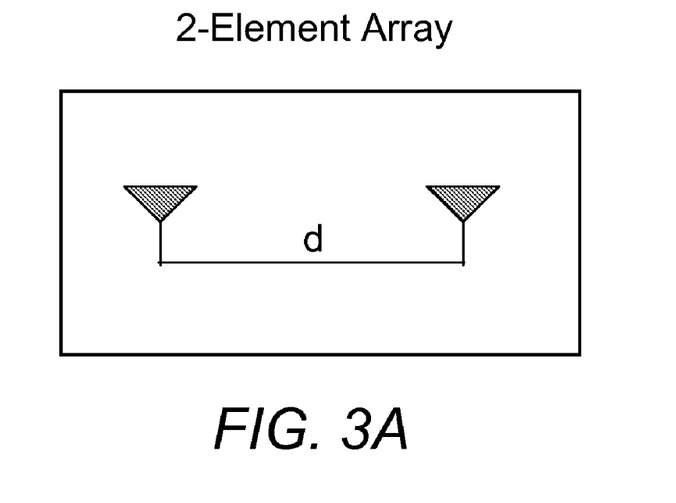
FIG. 3A depicts an exemplary 2-element array.
Figure 3B:
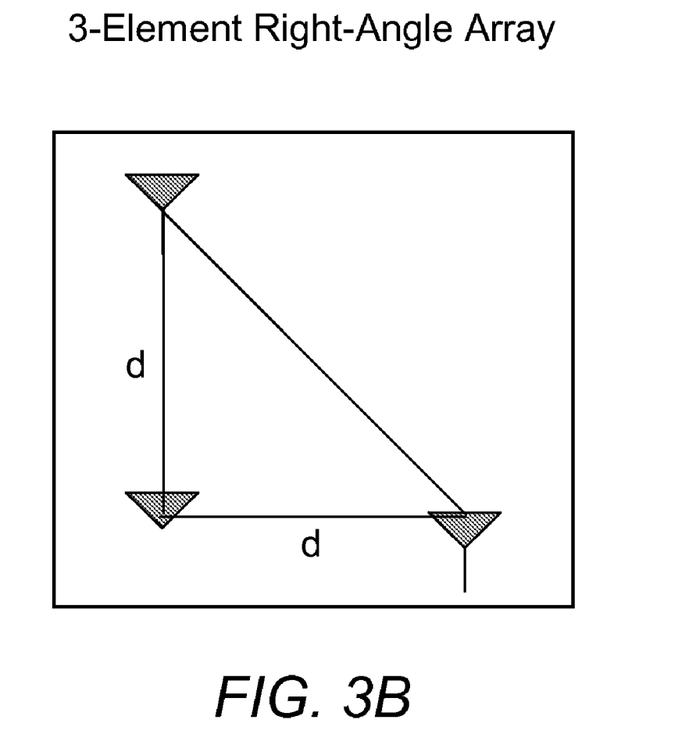
FIG. 3B depicts an exemplary right-triangular isosceles array.
Figure 3C:
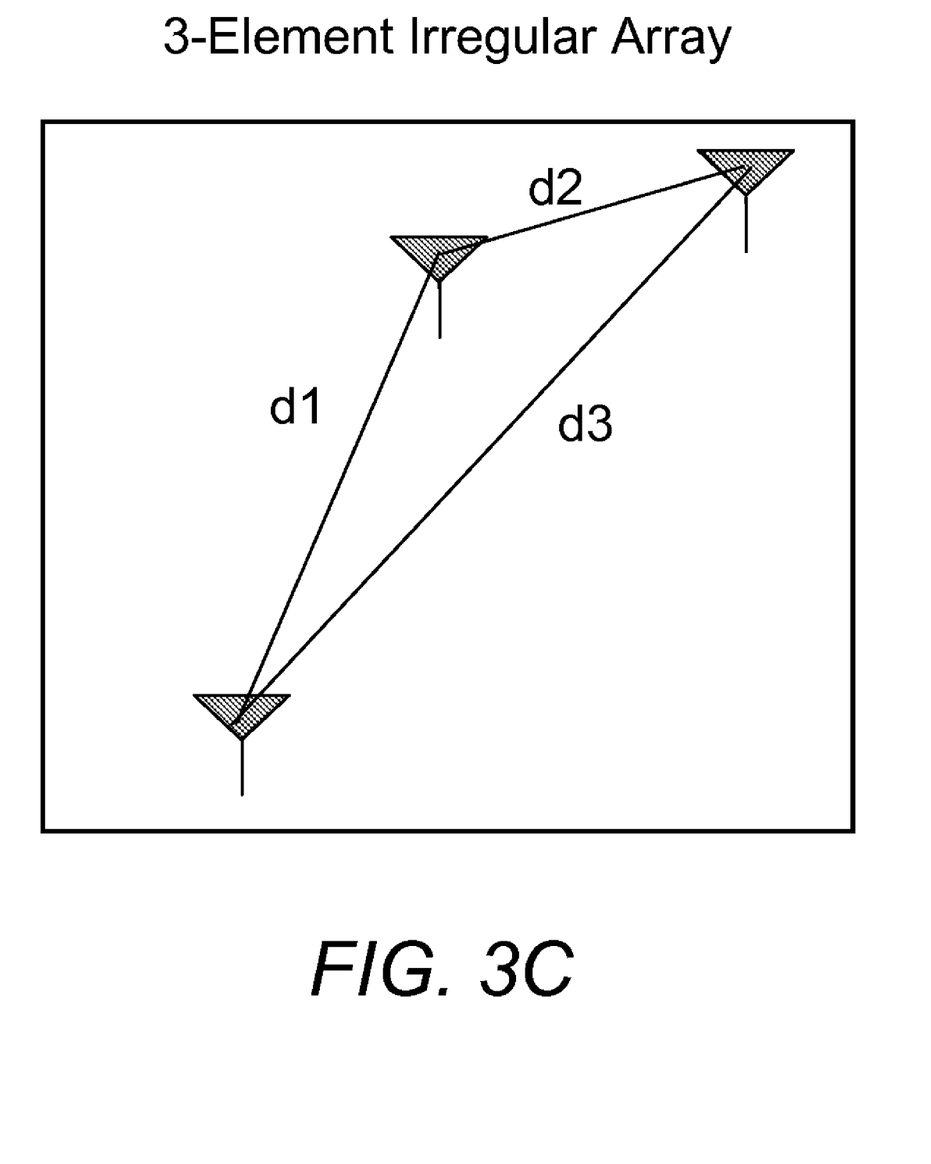
FIG. 3C depicts an exemplary irregular triangular array where no two angles or distances between elements are the same.

Application of the HAVE methodology is described below in the context of the exemplary array configurations shown in FIGS. 3A-3C. FIG. 3A depicts an exemplary array having two elements, i.e., an array comprising a single PEP. FIG. 3B shows an exemplary isosceles right-triangular array, i.e., an array comprising three PEPs, two of which have the same distance d between elements. FIG. 3C shows an exemplary irregular array also comprising three PEPs, but none of which have the same distance d between elements. Application of the HAVE methodology for various embodiments of these arrays is described below.

Figure 4A:
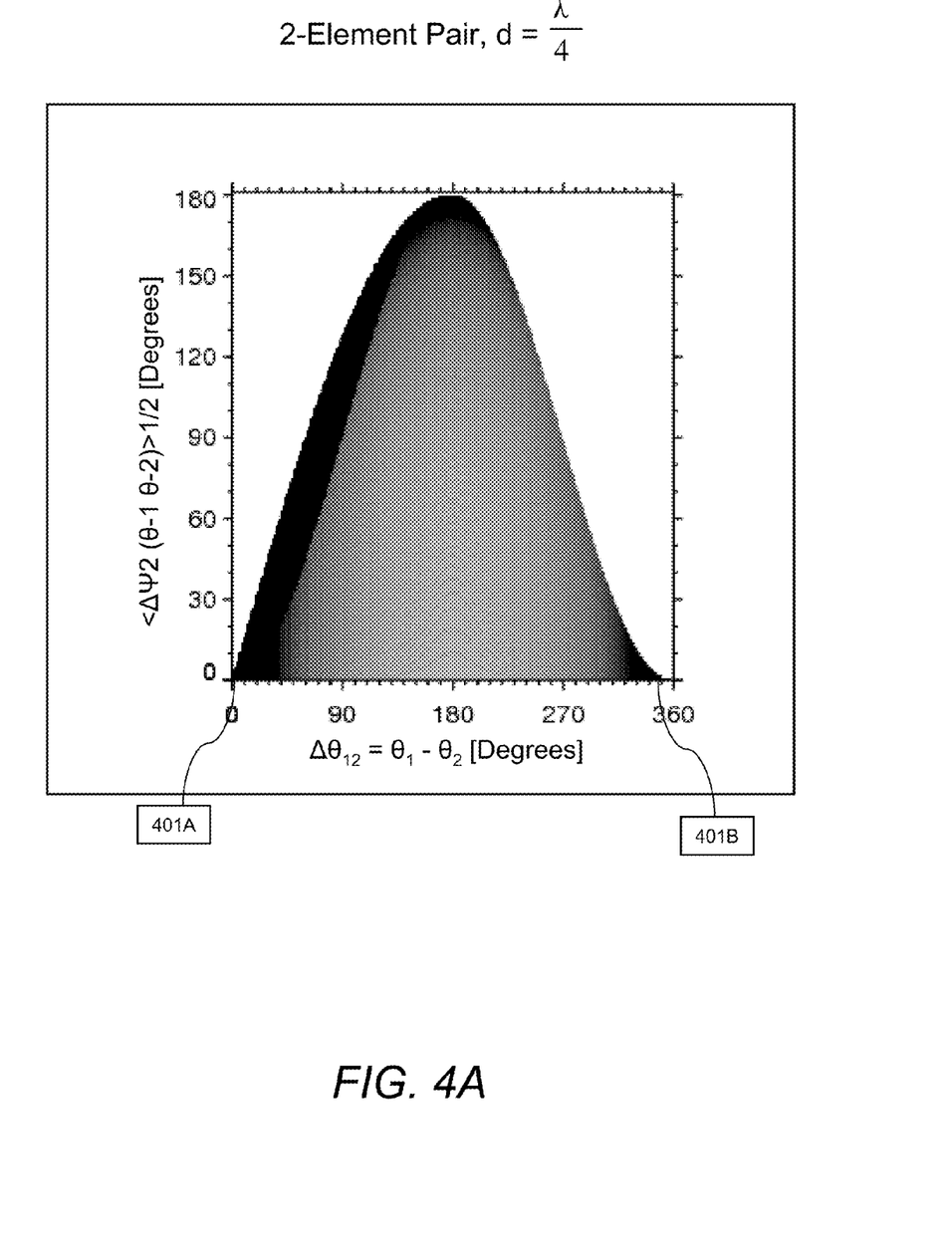
FIGS. 4A-4D depict histograms for array visualization and evaluation (HAVEs) in accordance with the present invention for a single PEP having elements one-quarter wavelength, one-half wavelength, one wavelength, and two wavelengths apart, respectively.

FIGS. 4A-4D depict exemplary HAVEs for a simple two-element array such as that shown in FIG. 3A, consisting of two elements aligned with the x-axis and having minimum element spacing $$d_{\min} = \frac{\lambda}{4}, \frac{\lambda}{2}, \lambda, \text{ and } 2\lambda,$$

respectively. As seen in FIG. 4A, for a single PEP having elements separated by $$d_{\min} = \frac{\lambda}{4},$$

the HAVE exhibits a zero distance metric $\sqrt{\langle\Delta\Psi^2(\theta_1,\theta_2)\rangle}=0$ for all angles $\Delta\theta_{12}=0$ to 360°. This is caused by the "mirror reflection" ambiguity for $\theta_2=360°-\theta_1$. As the angular distance between angles of arrival $\Delta\theta_{12}$ ranges from 0 to 360°, the maximum "distance" $\sqrt{\langle\Delta\Psi^2(\theta_1,\theta_2)\rangle}$ increases from zero at $\Delta\theta_{12}=0°$ to 180° at $\Delta\theta_{12}=180°$, and the decreases back to zero at $\Delta\theta_{12}=360°$, creating the "hump-like" structure 401 in the histogram. This indicates that the maximum "distance" between the array measurements generally increases as the effective distance between the angles of arrival $\Delta\theta_{12}$ increases. Note that the distance between angles of arrival for $\Delta\theta_{12}=0$ is equivalent to the distance between angles of arrival for $\Delta\theta_{12}=360°$ due to the 360° periodicity of the geometry.

Figure 4B:
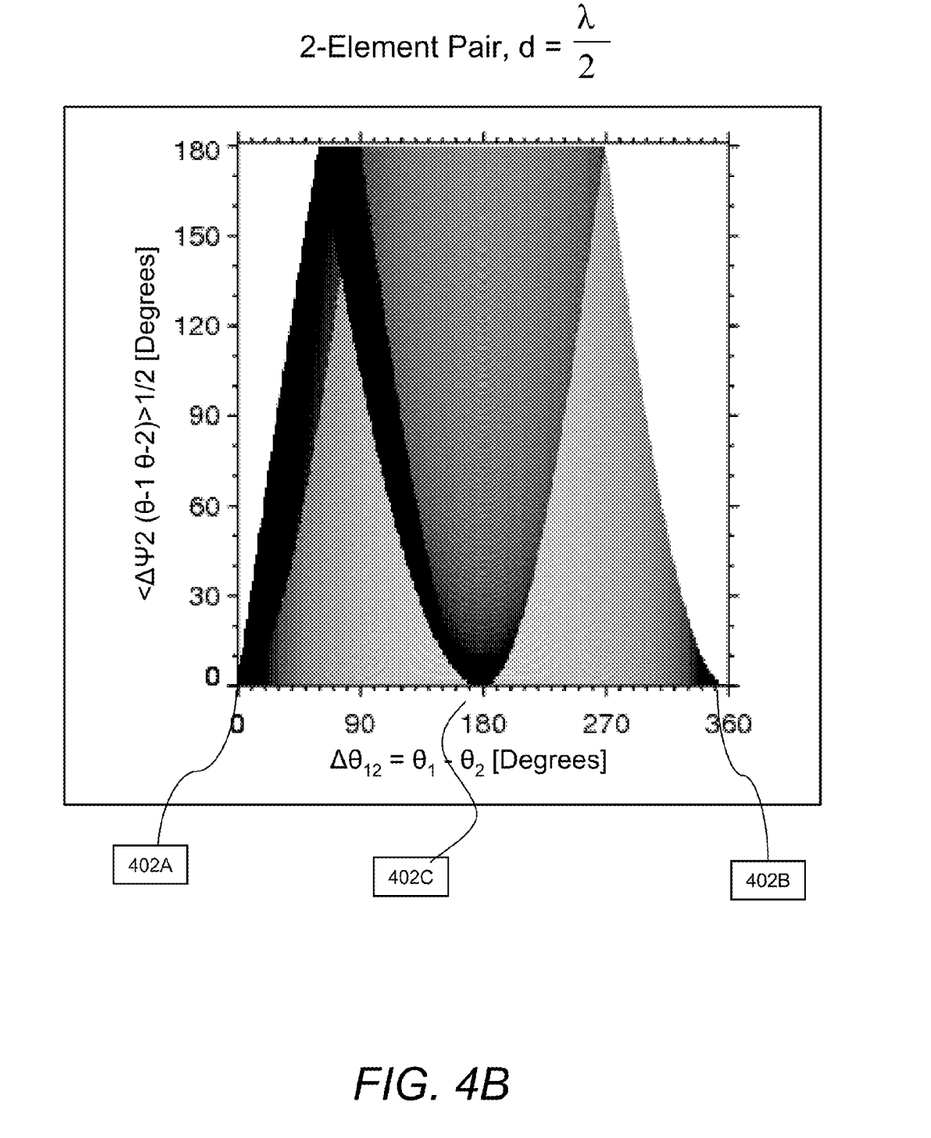

FIG. 4B depicts an exemplary HAVE for the case when $d_{min}$ is increased to $$\frac{\lambda}{2}.$$

In this case, a singular "end-fire" ambiguity 402 at $\Delta\theta_{12}=180°$ forms in addition to the "mirror reflection" ambiguity. Thus, as shown in FIG. 4B, the "mirror reflection" ambiguity is shown as a continuous background with $\sqrt{\langle\Delta\Psi^2(\theta_1,\theta_2)\rangle}=0$ for all angles $\Delta\theta_{12}=0$ to 360°, superimposed with the singular "end-fire" ambiguity indicated by the inverted hump at $\sqrt{\langle\Delta\Psi^2(\theta_1,\theta_2)\rangle}=0$ and $\Delta\theta_{12}=180°$. This new ambiguity occurs because the two-element array cannot distinguish between "end-fire" parallel and anti-parallel to the element separation vector, i.e., $\sqrt{\langle\Delta\Psi^2(0°,\pm180°)\rangle}=0$ when the wavelength of the incident wave is exactly twice as long as the element spacing.

Figure 4C:
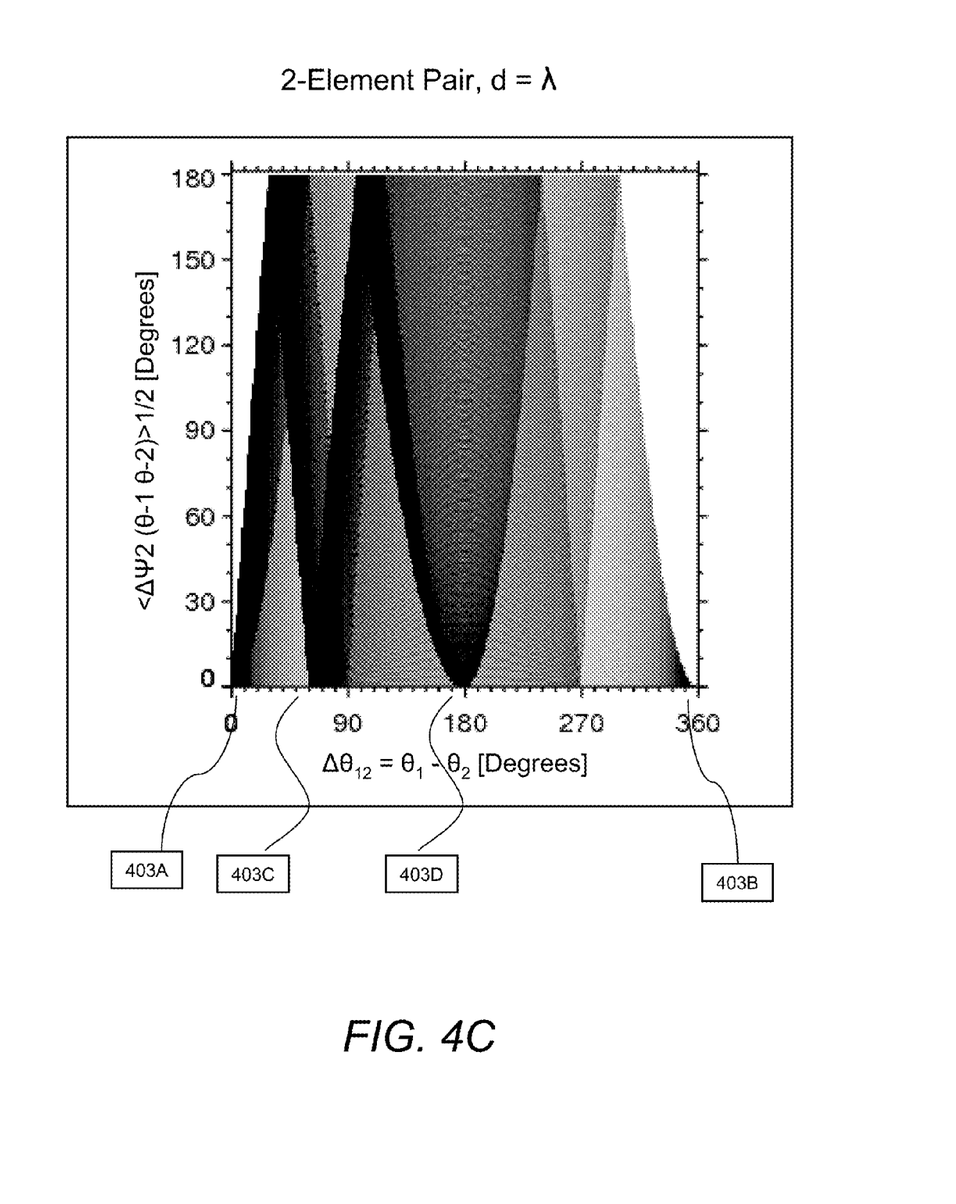
Figure 4D:
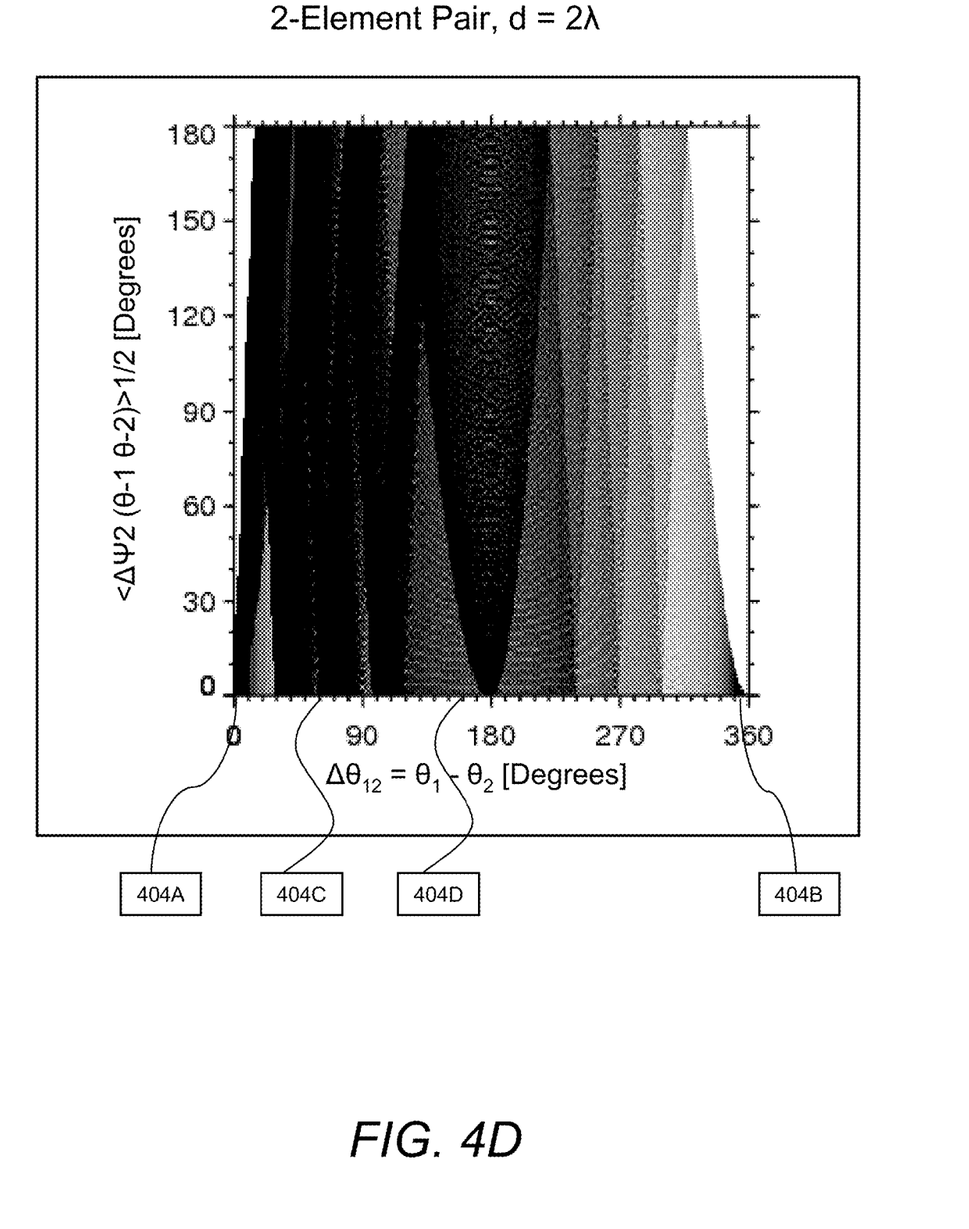

FIGS. 4C and 4D depict exemplary HAVEs for arrays having elements placed farther apart. As $d_{min}$ is increased further, the singular ambiguity will expand, causing angles other than the "end fire" angle to be ambiguous, until the case where $d_{min}=\lambda$, where a new singular "end-fire" ambiguity 403A at $\Delta\theta_{12}=180°$ is introduced. The HAVE shown in FIG. 4C shows this new "end-fire ambiguity" $\Delta\theta_{12}=180°$, plus superimpositions of the "mirror reflection" ambiguity described above and the additional "end-fire" ambiguity 403B described above for $$d_{\min} = \frac{\lambda}{2},$$

now centered near $\Delta\theta_{12}=75°$. Thus, the HAVE illustrates that a two-element array having $d_{min}=\lambda$ will suffer ambiguities at all of these values of $\Delta\theta_{12}$. FIG. 4D shows a HAVE for an array with $d_{min}=2\lambda$, and shows numerous ambiguities, including the "mirror reflection" ambiguity, a singular "end-fire" ambiguity and other ambiguities.

Figure 5A:
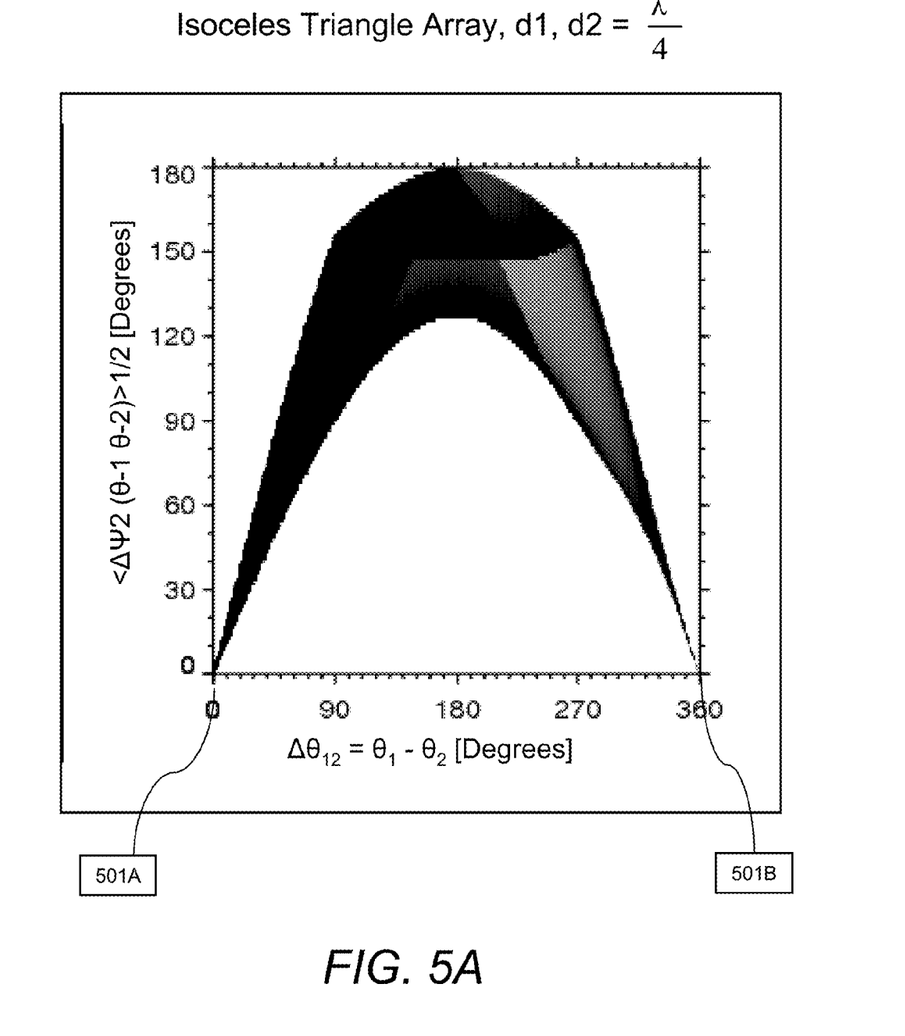
FIGS. 5A-5D depict histograms for array visualization and evaluation (HAVEs) in accordance with the present invention for an isosceles right-triangular array having two pairs of elements one-quarter wavelength, one-half wavelength, one wavelength, and two wavelengths apart, respectively.
Figure 5B:
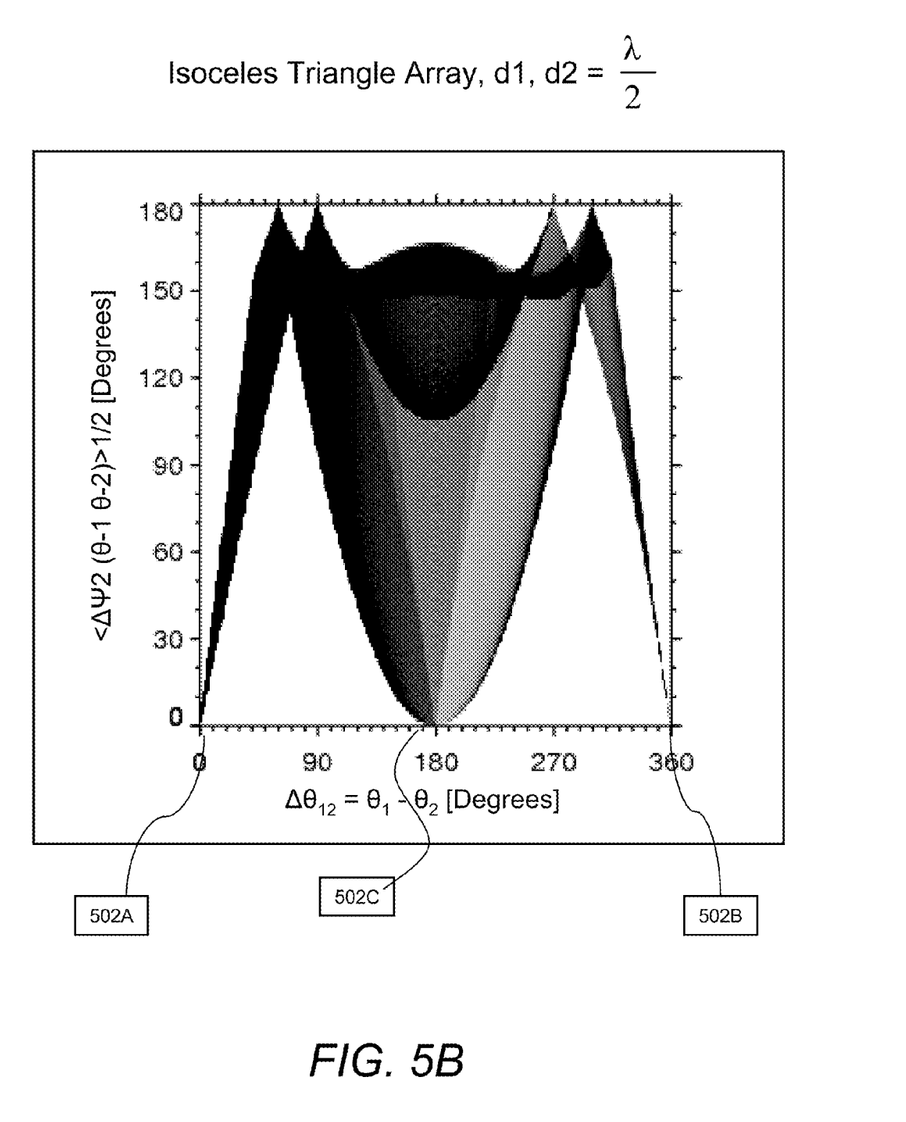
Figure 5C:
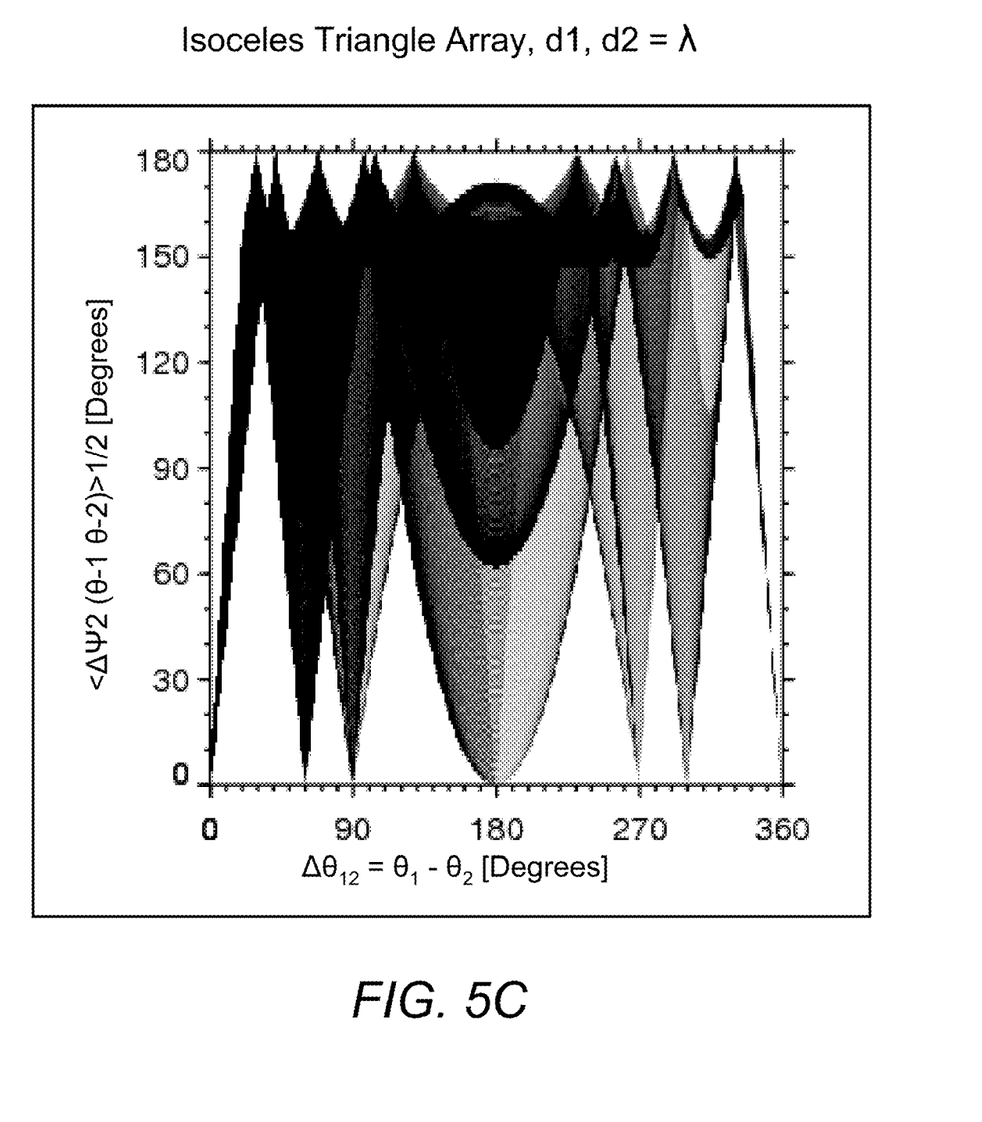
Figure 5D:
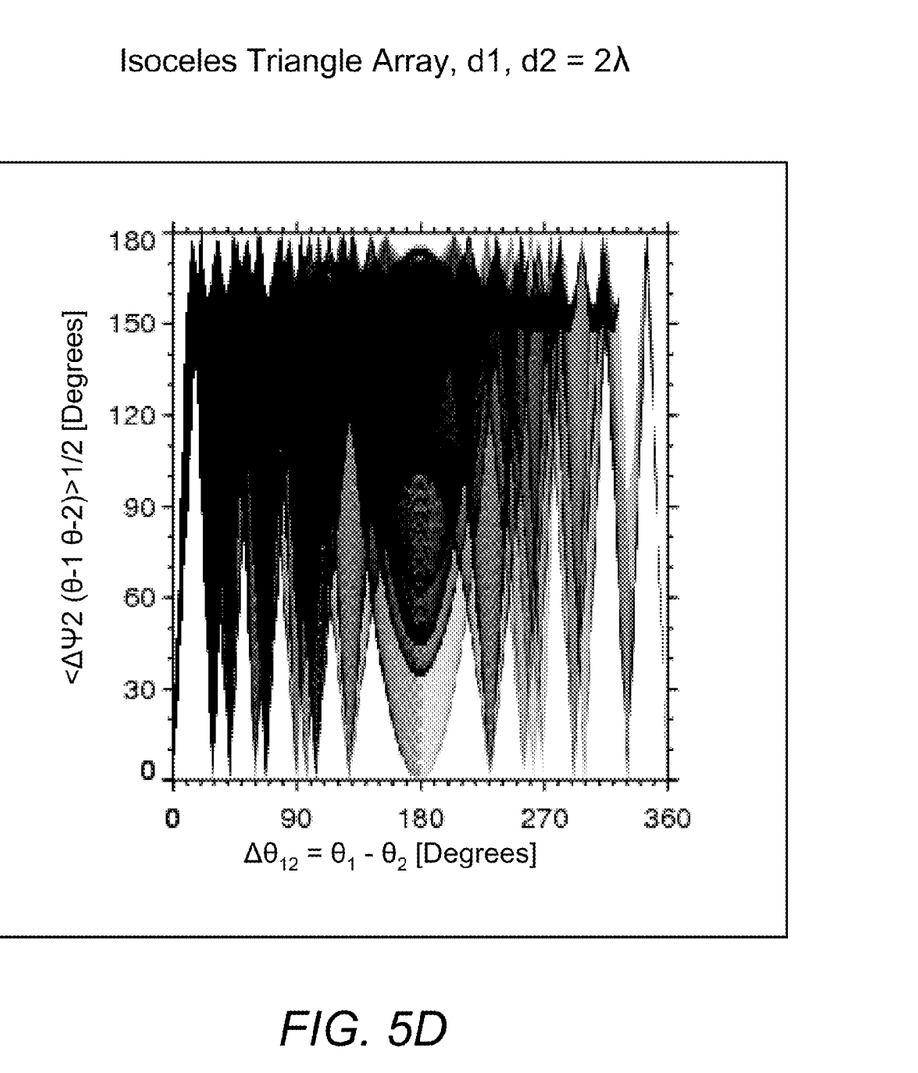

FIGS. 5A-5D depict exemplary HAVEs for a isosceles triangular array such as that shown in FIG. 3B, wherein one leg is aligned with the x-axis and the other equal-length leg is aligned with the y-axis, and the distance between elements in these legs is as described above with respect to the two-element array. The main difference between FIGS. 5A-5D and FIGS. 4A-4D is the absence of the continuous background shown in FIG. 4A-4D with $\sqrt{\langle\Delta\Psi^2(\theta_1,\theta_2)\rangle}=0$ for all angles $\Delta\theta_{12}=0$ to 360°. This difference is caused by the resolution of the "mirror reflection" ambiguity by the second pair of element aligned with the y-axis, which is orthogonal to the first pair aligned with the x-axis. Thus, as shown in FIG. 5A, at $$d_{\min} = \frac{\lambda}{4}$$

there is ambiguity only at $\Delta\theta_{12}=0$ (501A) and $\Delta\theta_{12}=360°$ (501B) since $\sqrt{\langle\Delta\Psi^2(\theta_1,\theta_2)\rangle}=0$ only at those values of $\Delta\theta_{12}$, and since these values of $\Delta\theta_{12}$ reflect no difference in resolved angles of arrival, there is in fact no ambiguity. However, as shown in FIGS. 5B, 5C, and 5D, as the distance between elements increases to and beyond $$d_{\min} = \frac{\lambda}{2},$$

the isosceles array is still vulnerable to ambiguities, with one ambiguity 502C shown in FIG. 5B at $\Delta\theta_{12}=180°$, and multiple ambiguities shown in FIGS. 5C ($d_{min}=\lambda$) and 5D ($d_{min}=2\lambda$).

Figure 6:
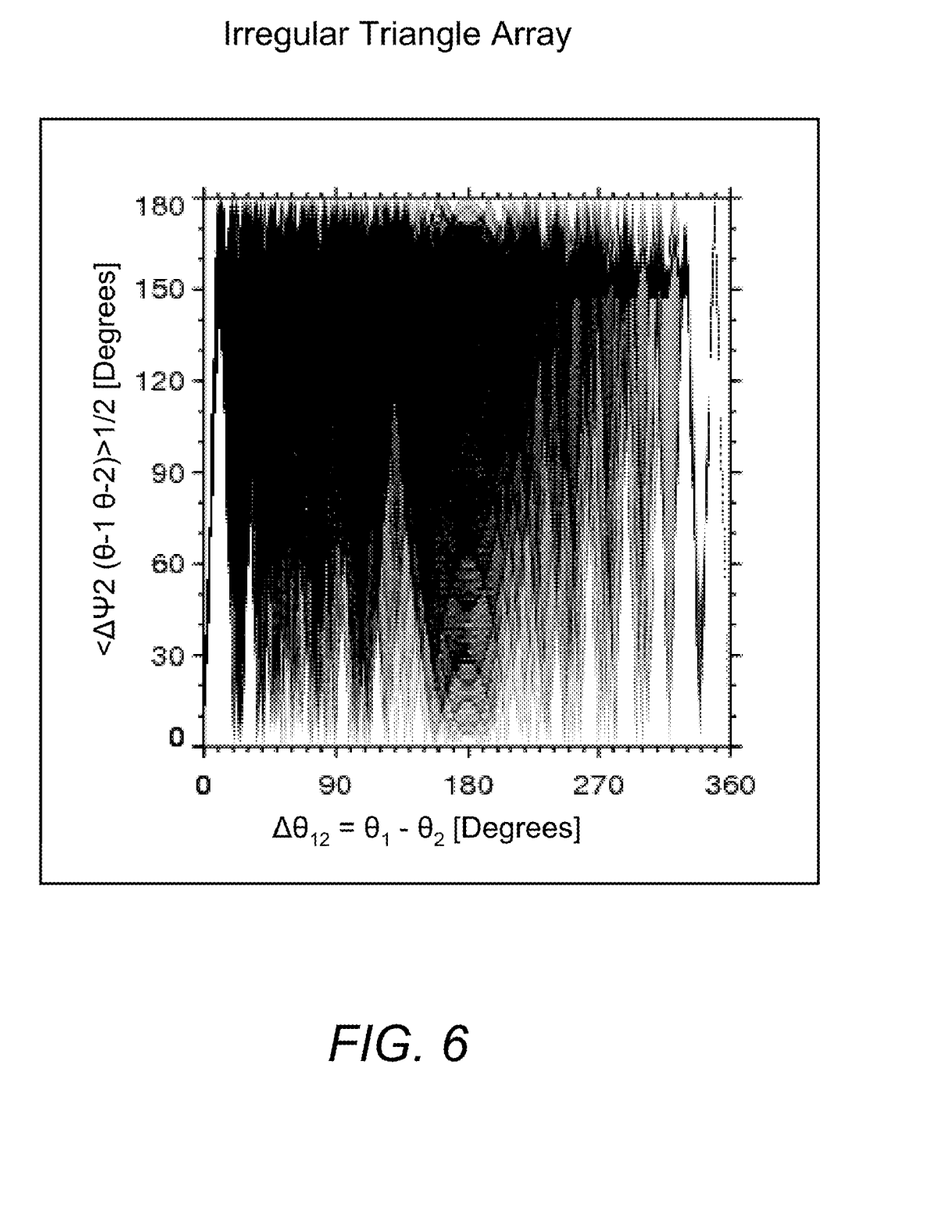
FIG. 6 depicts a histogram for array visualization and evaluation (HAVE) in accordance with the present invention for an irregular triangular array.

FIG. 6 depicts an exemplary HAVE for the third array configuration shown in FIG. 3, an irregular triangular array having no two elements placed equidistantly apart, for example, with elements placed at coordinates (0, 0), (−1.51λ, −2.85λ), and (2.54λ, 0). As shown in FIG. 6, in this array, the irregular placement of elements does not mitigate the ambiguities introduced by placing the elements farther than $$d = \frac{\lambda}{2}$$

apart. As shown in FIG. 6, this array exhibits numerous ambiguities, as indicated by the zero "distance" values $\sqrt{\langle\Delta\Psi^2(\theta_1,\theta_2)\rangle}=0$ for a variety of angle of arrival combinations $\Delta\theta_{12}$.

As demonstrated by the exemplary HAVEs shown in the figures, the existence of ambiguities and the angle of arrival combinations at which they occur is easily seen by using the HAVE histogram, and thus a HAVE histogram in accordance with the present invention can provide a powerful tool in analyzing and evaluating array designs, such as those output from the Genetic Fuzzy algorithm. In addition, in some embodiments, the methodology used to create a HAVE histogram can be incorporated into the Genetic Fuzzy analysis so that the Genetic Fuzzy algorithm will be more likely to output array designs free from ambiguities and that thus provide accurate, precise estimations of the direction of a signal incident to the array. The power of this methodology can particularly be realized when the number of array elements increases. The present invention provides a methodology that simplifies the analysis of ambiguities of array manifolds having any practical dimension by transforming the manifold's high N-dimensional space to a two-dimensional representation that is easy to visualize and analyze.

It should be noted that aspects of a system and method for creating and analyzing a histogram for ambiguity visualization and evaluation as described herein can be accomplished by executing one or more sequences of one or more computer-readable instructions read into a memory of one or more computers from non-volatile or volatile computer-readable media capable of storing and/or transferring computer programs or computer-readable instructions for execution by one or more computers. Non-volatile computer readable media that can be used can include a compact disk, hard disk, floppy disk, tape, magneto-optical disk, PROM (EPROM, EEPROM, flash EPROM), DRAM, SRAM, SDRAM, or any other magnetic medium; punch card, paper tape, or any other physical medium. Volatile media can include a memory such as a dynamic memory in a computer. In addition, computer readable media that can be used to store and/or transmit instructions for carrying out methods described herein can include non-physical media such as an electromagnetic carrier wave, acoustic wave, or light wave such as those generated during radio wave and infrared data communications.

Although particular embodiments, aspects, and features have been described and illustrated, it should be noted that the invention described herein is not limited to only those embodiments, aspects, and features. It should be readily appreciated that modifications may be made by persons skilled in the art, and the present application contemplates any and all modifications within the spirit and scope of the underlying invention described and claimed herein. Such embodiments are also contemplated to be within the scope and spirit of the present disclosure.

What is claimed is:

1. A computer-implemented method for providing visualization of a presence of an ambiguity in an angle of arrival of a signal incident on an array, comprising:

receiving data of a configuration of the array, the array including at least one pair of elements, the data including a number of pairs of elements in the array and a distance d between elements in each pair;

determining a pair-wise element phase difference $\Delta\Phi_{mn}(\theta)$ in phase of the signal as received by a pair of elements (m,n) in the array;

receiving data of a first angle of arrival of the signal $\theta_1$ and data of a second angle of arrival of the signal $\theta_2$ and determining a difference $\Delta\theta=\theta_2-\theta_1$;

determining a distance $\sqrt{\langle\Delta\Psi^2(\theta_1,\theta_2)\rangle}$ between the pair-wise element phase difference $\Delta\Phi_{mn}(\theta)$ at $\theta_1$ and the pair-wise element phase difference $\Delta\Phi_{mn}(\theta)$ at $\theta_2$ for all pairs of elements (m,n) in the array;

pairing each value of $\sqrt{\langle\Delta\Psi^2(\theta_1,\theta_2)\rangle}$ with each value of $\Delta\theta$ to create a plurality of paired values of $\sqrt{\langle\Delta\Psi^2(\theta_1,\theta_2)\rangle}$ and $\Delta\theta$;

transforming data of the paired values into data of a histogram; and transforming the data of the histogram into a visual display indicative of the presence of an ambiguity in the angle of arrival of the signal.

2. The method according to claim 1, wherein the pair-wise element phase difference $\Delta\Phi_{mn}(\theta)$ is calculated by the equation:

$$\Delta\Phi_{1,2} = \Phi_2 - \Phi_1 = \frac{2\pi}{\lambda}d\sin(\theta)$$

where d is the distance between the pair of elements (m, n) and θ is the angle of approach of the signal to the pair of elements (m, n).

3. The method according to claim 1, wherein the distance $\sqrt{\langle\Delta\Psi^2(\theta_1,\theta_2)\rangle}$ is calculated by the equation:

$$\sqrt{\langle\Delta\Psi^2(\theta_2,\theta_2)\rangle} \equiv \frac{\sqrt{2}}{\sqrt{N_E(N_E-1)}}\sqrt{\sum_{n=1,m=n+1}^{N_E}\Delta\Psi_{n,m}^2(\theta_1,\theta_2)}$$

wherein $N_E$ is the number of elements in the array.

4. A computer-implemented method for providing visualization of a presence of an ambiguity in an angle of arrival of a signal incident on an array, comprising:

receiving data of a configuration of the array, the array including at least one pair of elements, the data including a number of pairs of elements in the array and a distance d between elements in each pair;

determining a pair-wise element phase difference $\Delta\Phi_{mn}(\theta)$ in phase of the signal as received by a pair of elements (m,n) in the array, $\Delta\Phi_{mn}(\theta)$ being calculated by the equation:

$$\Delta\Phi_{mn} = \Phi_n - \Phi_m = \frac{2\pi}{\lambda}d\sin(\theta),$$

d being the distance between the pair of elements (m, n) and θ being the angle of approach of the signal to the pair of elements (m, n);

receiving data of a first angle of arrival of the signal $\theta_1$ and data of a second angle of arrival of the signal $\theta_2$ and determining a difference $\Delta\theta=\theta_2-\theta_1$;

determining a distance $\sqrt{\langle\Delta\Psi^2(\theta_1,\theta_2)\rangle}$ between the pair-wise element phase difference $\Delta\Phi_{mn}(\theta)$ at $\theta_1$ and the pair-wise element phase difference $\Delta\Phi_{mn}(\theta)$ at $\theta_2$ for all pairs of elements (m,n) in the array, $\sqrt{\langle\Delta\Psi^2(\theta_1,\theta_2)\rangle}$ being calculated by the equation:

$$\sqrt{\langle\Delta\Psi^2(\theta_1,\theta_2)\rangle} \equiv \frac{\sqrt{2}}{\sqrt{N_E(N_E-1)}}\sqrt{\sum_{n=1,m=n+1}^{N_E}\Delta\Psi_{n,m}^2(\theta_1,\theta_2)},$$

$N_E$ being the number of elements in the array;

pairing each value of $\sqrt{\langle\Delta\Psi^2(\theta_1,\theta_2)\rangle}$ with each value of $\Delta\theta$ to create a plurality of paired values of $\sqrt{\langle\Delta\Psi^2(\theta_1,\theta_2)\rangle}$ and $\Delta\theta$;

transforming data of the paired values into data of a histogram; and transforming the data of the histogram into a visual display indicative of the presence of an ambiguity in the angle of arrival of the signal.

5. A computer program product including a computer storage medium comprising one of volatile media and nonvolatile media and a computer program code mechanism embedded in the computer storage medium for determining and displaying a visual indication of the presence of an ambiguity in an angle of arrival of a signal, comprising:

a computer code module configured to receive data of a configuration of an array, the array including at least one pair of elements, the data including a number of pairs of elements in the array and a distance d between elements in each pair;

a computer code module configured to determine a pair-wise element phase difference $\Delta\Phi_{mn}(\theta)$ in phase of a signal received by a pair of elements (m,n) in the array;

a computer code device configured to receive data of a first angle of arrival of the signal $\theta_1$ and data of a second angle of arrival of the signal $\theta_2$ and determining a difference $\Delta\theta=\theta_2-\theta_1$;

a computer code module configured to determine a distance $\sqrt{\langle\Delta\Psi^2(\theta_1,\theta_2)\rangle}$ between the pair-wise element phase difference $\Delta\Phi_{mn}(\theta)$ at $\theta_1$ and the pair-wise element phase difference $\Delta\Phi_{mn}(\theta)$ at $\theta_2$ for all pairs of elements (m,n) in the array;

a computer code device configured to pair each value of $\sqrt{\langle\Delta\Psi^2(\theta_1,\theta_2)\rangle}$ with each value of $\Delta\theta$ to create a plurality of paired values of $\sqrt{\langle\Delta\Psi^2(\theta_1,\theta_2)\rangle}$ and $\Delta\theta$;

a computer code device configured to transform data of the paired values into data of a histogram; and a computer code device configured to transform the data of the histogram into a visual display indicative of the ambiguity in the angle of arrival.

* * * * *